(12) United States Patent
Ariav

(10) Patent No.: US 7,523,038 B2
(45) Date of Patent: Apr. 21, 2009

(54) VOICE CONTROLLED SYSTEM AND METHOD

(76) Inventor: Arie Ariav, 122 Kochav Michael, 79304 Doar-Na Hof Ashkelon (IL)

( * ) Notice: Subject to any disclaimer, the term of this patent is extended or adjusted under 35 U.S.C. 154(b) by 761 days.

(21) Appl. No.: 10/522,769

(22) PCT Filed: Jul. 24, 2003

(86) PCT No.: PCT/IL03/00614

§ 371 (c)(1),
(2), (4) Date: Jan. 31, 2005

(87) PCT Pub. No.: WO2004/012422

PCT Pub. Date: Feb. 5, 2004

(65) Prior Publication Data

US 2005/0259834 A1    Nov. 24, 2005

Related U.S. Application Data

(60) Provisional application No. 60/399,419, filed on Jul. 31, 2002.

(51) Int. Cl.
*G10L 21/00* (2006.01)

(52) U.S. Cl. ............... 704/275; 704/254; 704/267; 379/74; 379/88.16

(58) Field of Classification Search ............ 704/267, 704/275, 241, 254, 246, 251, 270.1; 379/74, 379/88.16; 455/420
See application file for complete search history.

(56) References Cited

U.S. PATENT DOCUMENTS

| 3,198,884 | A |   | 8/1965 | Dersch |
|---|---|---|---|---|
| 3,742,143 | A |   | 6/1973 | Awipi |
| 4,301,328 | A | * | 11/1981 | Dorais .................. 704/267 |
| 4,357,488 | A | * | 11/1982 | Knighton et al. ........ 704/246 |
| 4,780,906 | A | * | 10/1988 | Rajasekaran et al. ..... 704/251 |
| 5,479,490 | A | * | 12/1995 | Nakashima ............ 379/74 |
| 5,640,490 | A | * | 6/1997 | Hansen et al. .......... 704/254 |
| 5,802,467 | A | * | 9/1998 | Salazar et al. .......... 455/420 |
| 5,960,395 | A | * | 9/1999 | Tzirkel-Hancock ....... 704/241 |
| 6,408,272 | B1 | * | 6/2002 | White et al. ............ 704/270.1 |
| 6,603,836 | B1 | * | 8/2003 | Johnston ............... 379/88.16 |
| 2002/0077829 | A1 | * | 6/2002 | Brennan et al. ......... 704/275 |

* cited by examiner

*Primary Examiner*—Vijay B Chawan

(57) ABSTRACT

A voice controlled system includes a microphone for receiving voice commands and for converting each voice command to an electrical output; a filter system connected to receive the electrical outputs of the microphone and to produce for each voice command a first output corresponding to the high-frequency component of the voice command, and a second output corresponding to the low-frequency component of the voice command; and a processor for processing the first and second outputs of the filter system, and for outputting, for each voice command, a first electrical signal when the low-frequency component precedes the high-frequency component in the respective voice command, and a second electrical signal when the high-frequency component precedes the low-frequency component in the respective voice command. The voice command is determined to be a "Yes" command when the low-frequency component precedes the high-frequency component; a "Stop" command when the high-frequency precedes the low-frequency component and a "No" command when the high-frequency component is below a predetermined threshold.

20 Claims, 3 Drawing Sheets

VOICE CONTROLLED SYSTEM AND METHOD

RELATED PATENT APPLICATION

This application is a National Phase Application of PCT/IL03/00614 having International Filing Date of 24 Jul. 2003, which claims priority from U.S. Provisional Patent Application No. 60/399,419 filed 31 Jul. 2002.

FIELD AND BACKGROUND OF THE INVENTION

The present invention relates to voice controlled systems, namely to systems which are electrically controlled by voice commands. The invention also relates to a method of controlling a device by voice commands.

Many voice controlled systems are known which convert voice commands to electrical signals for effecting various controls. Such voice controlled systems generally include a microphone, or other sound-to-electrical-signal converter, for converting the voice command to electrical signals, and a speech recognition system which analyzes the various voice commands and determines the best match of each command with respect to a previously stored library of commands in order to identify the specific voice command. Such systems, however, are quite complicated and expensive because of the sophisticated speech recognition circuitry required and the need to provide a stored vocabulary to be compared with each command.

However, there are many applications wherein the voice controlled system needs to recognize only a relatively small number of commands.

OBJECTS AND BRIEF SUMMARY OF THE PRESENT INVENTION

An object of the present invention is to provide a voice controlled system of the latter type, namely one which needs to recognize only relatively few voice commands, and which is capable of being constructed with relatively simple and inexpensive components. Another object of the invention is to provide a method of controlling a device by voice commands.

According to one broad aspect of the present invention, there is provided a voice controlled system, comprising: a microphone for receiving voice commands and for converting each voice command to an electrical output; a filter system connected to receive the electrical outputs of the microphone and to produce for each voice command a first output corresponding to the high-frequency component of the voice command, and a second output corresponding to the low-frequency component of the voice command; and a processor for processing the first and second outputs of the filter system and for outputting, for each voice command, a first electrical signal when the low-frequency component precedes the high-frequency component in the respective voice command, and a second electrical signal when the high-frequency component precedes the low-frequency component in the respective voice command.

In the described preferred embodiment, the voice commands include a "Yes" command, wherein the low-frequency component from the filter system precedes the high-frequency component and which is indicated by the first electrical signal output from the processor, and a "Stop" command, wherein the high-frequency component from the filter system precedes the low-frequency component and which is indicated by the second electrical signal outputted from the processor.

As described below, the "S" sound is characterized by a relatively high frequency which can be easily distinguished by filter systems. For example, a voice command including the "S" sound will produce a high-frequency component above about 3 KHz. Therefore, by merely determining where the high-frequency component is with respect to the low-frequency component of the respective voice command, a "Yes" command can be easily distinguished from a "Stop" command.

According to further features in the described preferred embodiment, the processor, in processing the first and second outputs of the filter system for each voice command, outputs a third electrical signal when the first output of the filter system, corresponding to the high-frequency component of the voice command, is below a predetermined threshold. In the described preferred embodiment, the voice commands also include a "No" command, which is indicated by the third electrical signal output from the processor.

According to another aspect of the present invention, there is provided a voice controlled system, comprising: a microphone for receiving voice commands and for converting each voice command to an electrical output; a filter system connected to receive the electrical outputs of the microphone and to produce for each voice command a first output corresponding to the high-frequency component of the voice command, and a second output corresponding to the low-frequency component of the voice command; and a processor for processing the first and second outputs of the filter system for each voice command and for outputting one electrical signal when the low-frequency component precedes the high-frequency component in the respective voice command, and another electrical signal when the first output of the filter system for each voice command, corresponding to the high-frequency component of the voice command, is below a predetermined threshold.

In the described preferred embodiment, the voice command includes a "YES" command, which is indicated by the one electrical signal outputted from the processor, and a "NO" command, which is indicated by the another electrical signal output from the processor.

According to further features with respect to this aspect of the invention, the processor, in processing the first and second outputs of the filter system for each voice command, also outputs a further electrical signal when the high-frequency component of the voice command precedes the low-frequency component in the respective voice command. Thus, when the voice commands include a "Stop" command, this would be indicated by the further electrical signal outputted from the processor.

According to a still further aspect of the invention, there is provided a method of controlling a device by voice commands, by providing the device with a microphone, filter system and processor as described above, and controlling the device in accordance with the signals outputted from the processor.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiment described is for purposes of example only, and that the invention is capable of being embodied in other forms and applications than described herein.

DESCRIPTION OF A PREFERRED EMBODIMENT

Figure 1:
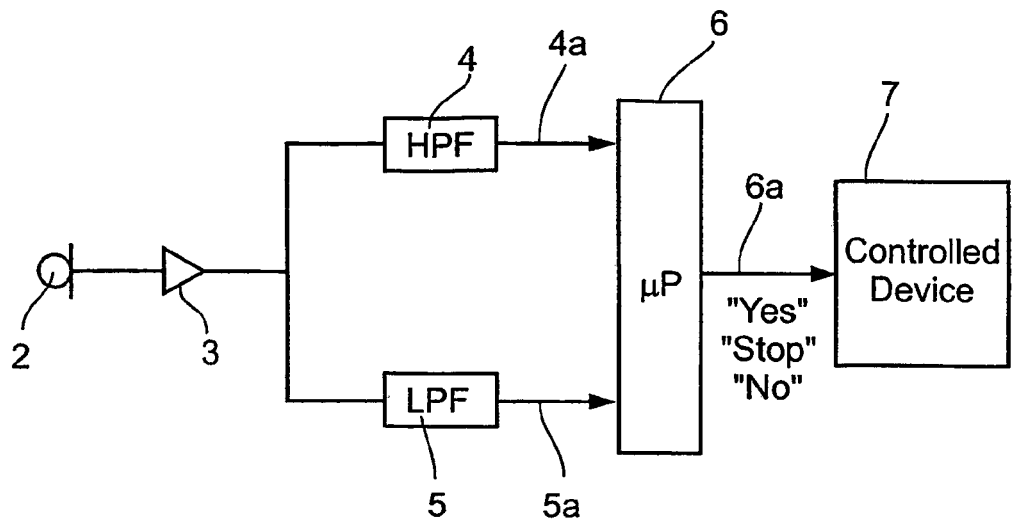
FIG. 1 is a block diagram illustrating one form of voice controlled system constructed in accordance with the present invention.

FIG. 1 is a block diagram illustrating one form of voice controlled system constructed in accordance with the present invention. The illustrated system includes a microphone 2 for receiving voice commands and for converting each voice command to an electrical output. The output is amplified in amplifier 3 and fed to a filter system including a high-frequency pass filter 4 and a low-frequency pass filter 5. The high-frequency pass filter 4 produces, for each voice command, a first output via output line 4a corresponding to the high-frequency component of the voice command; and the low-frequency pass filter 5 produces a second output, via its output line 5a, corresponding to the low-frequency component of the voice command.

The two filter output lines 4a, 5a are connected as inputs to a microprocessor 6 which processes the filter outputs, and outputs three electrical signals on its output line 6a identifying the voice command received by the microphone 2.

The system illustrated in FIG. 1 is designed for identifying the following three voice commands: (1) a "Yes" command, (2) a "Stop" command, and (3) a "No" command.

These three commands are applied to a controlled device 7 which is controlled in response to the specific voice command. For example, the controlled device 7 could involve a system which is controlled to initiate a predetermined task when the "Yes" command is given, to terminate the performance of a task when the "Stop" command is given, and not to initiate the performance of a task when the "No" command is given.

These three voice commands can be easily distinguished from each other by means of relatively simple circuitry in the following manner.

First, it is to be noted that a "Yes" command and a "Stop" command both involve an "S" sound. An "S" sound produces a high-frequency component, e.g., above 1 KHz, in the output from the microphone 2. When the voice command is "Yes", the high-frequency component is preceded by a low-frequency component; whereas when the voice command is "Stop", the high-frequency component is followed by the low-frequency component.

On the other hand, the "No" voice command has no "S" sound, and therefore no high-frequency component.

Accordingly, microprocessor 6 can easily distinguish from each of these three voice commands in the following manner:

(a) If the low-frequency signal on line 5a from the low-frequency pass filter 5 precedes the high-frequency signal on line 4a from the high-frequency pass filter 4 for a particular voice command, the voice command is "Yes", and the "Yes" command appears on output line 6a from processor 6.

(b) If the high-frequency component on output line 4a from the high-frequency pass filter 4 precedes the low-frequency component on line 5a from the low-frequency pass filter 5 for a particular voice command, the voice command is "Stop", and appears on output line 6a of processor 6.

(c) On the other hand, if the high-frequency component on line 4a from the high-frequency pass filter 4 is below a predetermined threshold in a particular voice command, the voice command is "No", and appears on output line 6a of the processor 6.

Figure 2:
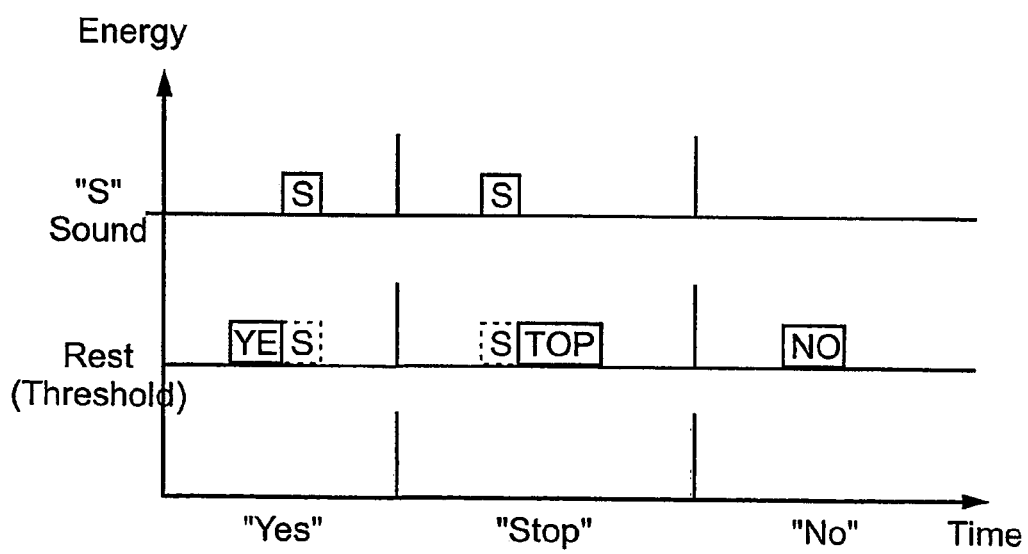
FIG. 2 is an Energy-Time diagram helpful in explaining the operation of the system of FIG. 1.

The foregoing is illustrated in the Energy-Time diagram of FIG. 2, wherein it will be seen that the "Yes" voice command produces a high-frequency component (the "S" sound) following the low-frequency component; the "Stop" voice command produces a high-frequency component preceding the low-frequency component; and the "No" command produces no significant high-frequency component.

Figure 3:
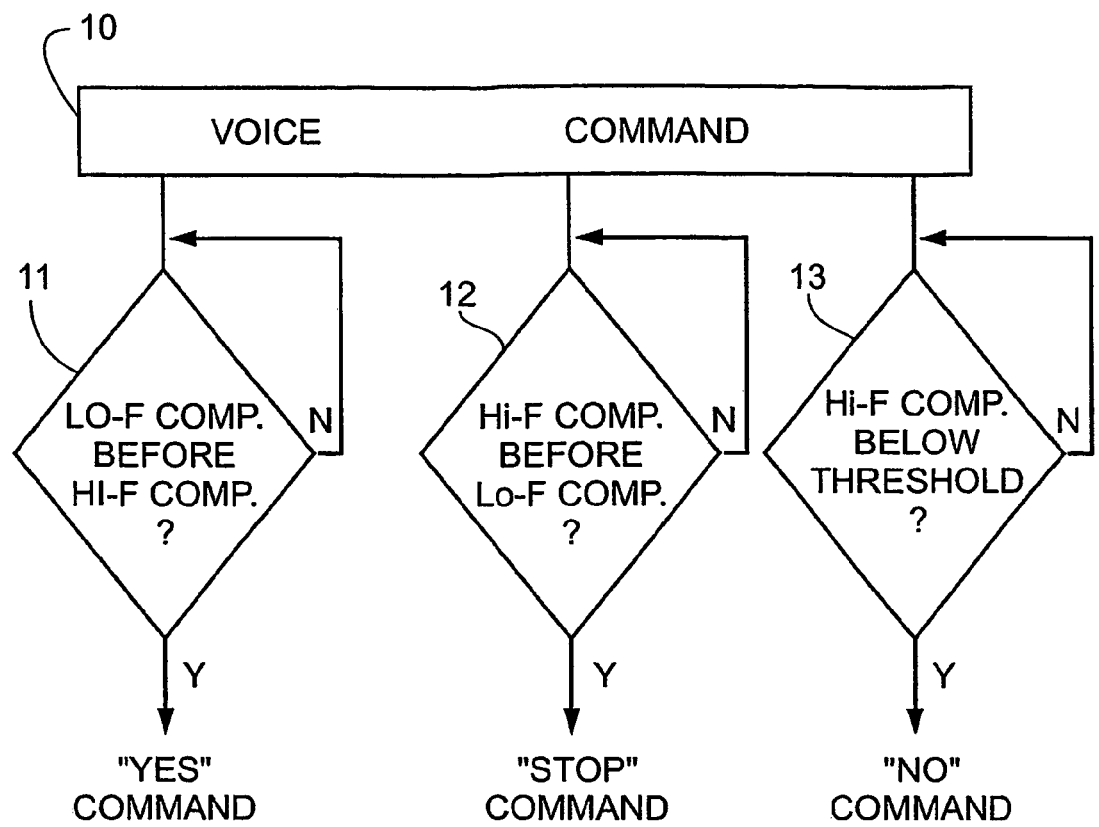
FIG. 3 is a flow chart illustrating the operation of the processor in the voice controlled system of FIG. 1.

The foregoing is also illustrated in the flow chart of FIG. 3 illustrating the operation of the microprocessor 6 receiving the outputs 4a, 5a, from the filters 4 and 5. Thus, as shown in FIG. 3, the voice command received by the microphone 2 (block 10), after being processed by the two filters 4, 5 is analyzed by the three decision blocks 11, 12, 13. Decision block 11 determines whether the low frequency component is before the high frequency component, and if so outputs a "Yes" command; decision block 12 determines whether the high frequency component is before the low frequency component, and if so outputs a "Stop" command; and decision block 13 determines whether the high-frequency component is below a predetermined threshold, and if so it outputs a "No" command.

It will thus be seen that device 7 can be effectively controlled according to one or more of the above three commands by a relatively simple and inexpensive system which needs to recognize only these commands.

Figure 4:
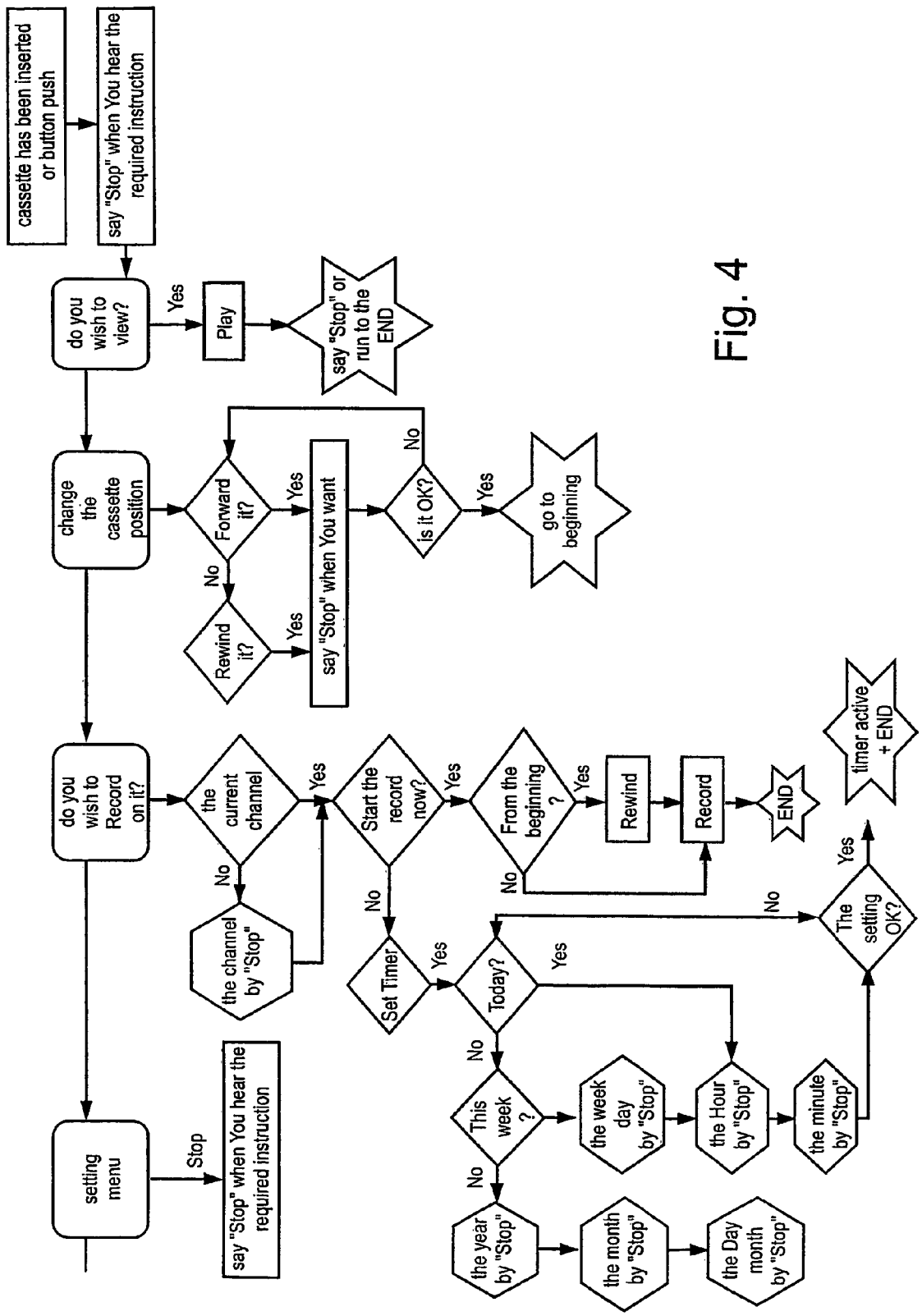
FIG. 4 is a flow chart illustrating a manner of programming a video recorder in accordance with the present invention.

FIG. 4 illustrates, for purposes of example, a manner of programming a video recorder by the above three voice commands.

While the invention has been described with respect to one preferred embodiment, it will be appreciated that this is set forth merely for purposes of example, and that many variations may be made. For example, the invention could be implemented in a system which distinguishes only two commands, e.g., "Yes" and "No", or which distinguishes four or more commands, by providing further voice commands, e.g., one involving only a high-frequency component, such as merely the sound "Sha . . . ", "She . . . ", "Shi . . . ", "Sho . . . ", "Shu . . . ", or one involving a high-frequency component preceding a low-frequency component and above a predetermined threshold, or one involving a high-frequency component following a low-frequency component above a predetermined threshold. It will also be appreciated that the voice commands could be used for controlling many other types of devices or systems.

Many other variations, modifications and applications of the invention will be apparent.

What is claimed is:

1. A voice controlled system, comprising:
a microphone for receiving voice commands and for converting each voice command to an electrical output;
a filter system connected to receive the electrical outputs of the microphone and to produce for each voice command a first output corresponding to the high-frequency component of the voice command, and a second output corresponding to the low-frequency component of the voice command; and a processor for processing said first and second outputs of the filter system and for outputting, for each voice command, a first electrical signal when the low-frequency component precedes the high-frequency component in the respective voice command, and a second electrical signal when the high-frequency component precedes the low-frequency component in the respective voice command.

2. The voice controlled system according to claim 1, wherein said voice commands include a "Yes" command, wherein the low-frequency component from the filter system precedes the high-frequency component, and which is indicated by said first electrical signal output from the processor; and a "Stop" command, wherein the high-frequency component from the filter system precedes the low-frequency component and which is indicated by said second electrical signal outputted from the processor.

3. The voice controlled system according to claim 1, wherein said processor, in processing said first and second outputs of the filter system for each voice command, outputs a third electrical signal when the first output of the filter system, corresponding to the high-frequency component of the voice command, is below a predetermined threshold.

4. The voice controlled system according to claim 3, wherein said voice commands also include a "No" command, which is indicated by said third electrical signal output from the processor.

5. The voice controlled system according to claim 1, wherein said first output produced by the filter system for each voice command corresponds to the component of the voice command having the frequency of the "S" sound, wherein said second output produced by the filter system for each voice command corresponds to the component of the voice command below the frequency of the "S" sound.

6. The voice controlled system according to claim 1, wherein said first output produced by the filter system for each voice command corresponds to the component of the voice command above 1 KHz, and wherein the second output produced by the filter system for each voice command corresponds to the component of the voice command below 1 KHz.

7. The voice controlled system according to claim 1, wherein said filter system includes a high-frequency pass filter connected to receive said microphone output for each command and to produce said first output corresponding to the high-frequency component of the voice command; and a low-frequency pass filter connected to receive said microphone output for each command and to produce said second output corresponding to the low-frequency component of the voice command.

8. A voice controlled system, comprising:
a microphone for receiving voice commands and for converting each voice command to an electrical output;
a filter system connected to receive the electrical outputs of the microphone and to produce, for each voice command, a first output corresponding to the high-frequency component of the voice command, and a second output corresponding to the low-frequency component of the voice command; and
a processor for processing said first and second outputs of the filter system for each voice command and for outputting one electrical signal when the low-frequency component precedes the high-frequency component in the respective voice command, and another electrical signal when said first output of the filter system for each voice command, corresponding to the high-frequency component of the voice command, is below a predetermined threshold.

9. The voice controlled system according to claim 8, wherein said voice command includes a "YES" command, which is indicated by said one electrical signal outputted from the processor, and a "NO" command, which is indicated by said another electrical signal output from the processor.

10. The voice controlled system according to claim 9, wherein said processor, in processing said first and second outputs of the filter system for each voice command, also outputs a further electrical signal when the high-frequency component of the voice command precedes the low-frequency component in the respective voice command.

11. The voice controlled system according to claim 10, wherein said voice commands include a "Stop" command which is indicated by said further electrical signal outputted from the processor.

12. The voice controlled system according to claim 10, wherein said first output produced by the filter system for each voice command corresponds to the component of the voice command having the frequency of the "S" sound, wherein said second output produced by the filter system for each voice command corresponds to the component of the voice command below the frequency of the "S" sound.

13. The voice controlled system according to claim 10, wherein said first output produced by the filter system for each voice command corresponds to the component of the voice command above 1 KHz, and wherein the second output produced by the filter system for each voice command corresponds to the component of the voice command below 1 KHz.

14. The voice controlled system according to claim 10, wherein said filter system includes a high-frequency pass filter connected to receive said microphone output for each command and to produce said first output corresponding to the high-frequency component of the voice command; and a low-frequency pass filter connected to receive said microphone output for each command and to produce said second output corresponding to the low-frequency component of the voice command.

15. A method of controlling a device by voice commands, comprising:
providing the device with:
a microphone for receiving voice commands and for converting each voice command to an electrical output;
a filter system connected to receive the electrical outputs of the microphone and to produce for each voice command a first output corresponding to the high-frequency component of the voice command, and a second output corresponding to the low-frequency component of the voice command; and
a processor for processing said first and second outputs of the filter system and for outputting, for each voice command, a first electrical signal when the low-frequency component precedes the high-frequency component in the respective voice command, and a second electrical signal when the high-frequency component precedes the low-frequency component in the respective voice command;
and controlling said device in accordance with the signals outputted from said processor.

16. The method controlled system according to claim 15, wherein said first output produced by the filter system for each voice command corresponds to the component of the voice command having the frequency of the "S" sound, wherein said second output produced by the filter system for each voice command corresponds to the component of the voice command below the frequency of the "S" sound.

17. The method system according to claim 15, wherein said first output produced by the filter system for each voice command corresponds to the component of the voice command above 1 KHz, and wherein the second output produced by the filter system for each voice command corresponds to the component of the voice command below 1 KHz.

18. The method according to claim 15, wherein said voice commands include a "Yes" command, wherein the low-frequency component from the filter system precedes the high-frequency component, and which is indicated by said first electrical signal output from the processor; and a "Stop" command, wherein the high-frequency component from the filter system precedes the low-frequency component and which is indicated by said second electrical signal outputted from the processor.

19. The method according to claim 15, wherein said processor, in processing said first and second outputs of the filter system for each voice command, outputs a third electrical signal when the first output of the filter system, corresponding to the high-frequency component of the voice command, is below a predetermined threshold.

20. The method according to claim 19, wherein said voice commands also include a "No" command, which is indicated by said third electrical signal output from the processor.

* * * * *